April 16, 1963 L. C. HEHN 3,085,468
DICHROIC FILTER COLOR BALANCE SYSTEMS
Filed Jan. 21, 1959 2 Sheets-Sheet 1

April 16, 1963 L. C. HEHN 3,085,468
DICHROIC FILTER COLOR BALANCE SYSTEMS
Filed Jan. 21, 1959 2 Sheets-Sheet 2

United States Patent Office 3,085,468
Patented Apr. 16, 1963

3,085,468
DICHROIC FILTER COLOR BALANCE SYSTEMS
Lester C. Hehn, 3 Sands Light Road,
Port Washington, N.Y.
Filed Jan. 21, 1959, Ser. No. 788,105
4 Claims. (Cl. 88—24)

The present invention relates to dichroic or interference filter color balance systems for photographic color processes.

Filters or mirrors having dichroic coatings permit light of desired wave lengths to be transmitted, and the remaining wave lengths to be reflected. The wave lengths of the reflected and transmitted light for any dichroic coating varies with the angle of incidence of the light. As the angle of the incidence is altered, light of different wave lengths is reflected. The variation of the wave lengths of the reflected light is dependent upon the degree of angularity of the projected light from the normal incidence and upon the particular dichroic coating. When the dichroic filters are tilted, the curve peaks of the transmitted and reflected light shift toward shorter wave lengths. These properties of dichroic coatings are used in the present invention to obtain correct color balance for various photographic processes.

In making photographic color reproductions there are two main problems. One is obtaining the correct exposure or total amount of light. The other problem is to obtain the correct color balance of the light.

In the past there have been several methods for obtaining suitable exposure and color balance. There have been single exposure systems where the exposure of the printing material to light is controlled by the time of exposure and the color balance is controlled by the use of color correcting filters. This procedure has been used but has several disadvantages. The color correction filters are not infinitely variable which makes it difficult to obtain small changes in the correction of color balance. Also, color correction filters often correct over too wide a range of wave lengths and when correction is made for one color the balance of other colors might be detrimentally affected. The use of color corrective filters also introduces neutral density and results in a decrease of the saturation of the colors in the finished print.

An alternate single exposure color system that has been used for color printing in the past is the use of variable three-color light sources. The exposure is controlled by the time of a single exposure and the color balance is controlled by the use of red, green and blue lamps each having variable intensity control. The use of a three-color light source solves the problem of small color correction by having variable sets of lamps of three colors, e.g., red, green and blue, and provides more brilliant color in the print. However, it is difficult to obtain lamps having wave lengths over the desired narrow range and the color emission therefore tends to overlap. When correcting for one color, there might also be a shift in other colors. The use of three separate lamps each having a heavy coating of color requires the use of high wattage to provide a light output equal to that of a regular white light output of the usual enlarger lamp to provide a reasonable short exposure time. This causes a heat problem which might adversely affect the film. Fluorescent lamps have been used to minimize the heat problem but they do not provide sufficient brightness especially in the red part of the spectrum. Variable control circuits are expensive and the lamps are difficult to stabilize and control. In addition, the control components tend to be heavy and take up a great deal of space.

In the present invention dichroic (interference), filters or mirrors are used to obtain the proper color correction. By using specially selected dichroic coatings having the required transmission and reflection spectrum, it is possible to alter the white light color balance of a single printing lamp to conform with the requirements of the film and the print material. The above described properties of dichroic coatings are used in the dichroic filter color balance system for photographic reproduction. The dichroic filters are used, in taking photographs or in corrective color printing and enlarging, to reflect desired wave lengths of light and to transmit the wave lengths which are required to produce colored pictures having balanced colors. For the most complete control of exposure and color balance theree filters are needed, a red, a green and a blue. However, if color correction is required over only wave lengths of one color, it may be necessary to use only one dichroic filter. By tilting the dichroic filters, either more or less of particular wave lengths will be transmitted by the filters and the color balance of the printing light can be altered and controlled in small increments at will, as will be discussed more fully, infra.

A general object of the present invention is to provide means for reproducing color photographs having proper color balance by the use of dichroic filters.

A more specific object of the present invention is to provide dichroic filter systems which will permit color photographs to be readily reproduced and which will provide for the fine correction of unbalanced color over specific wave lengths of light.

A further object of the present invention is to produce systems for color correction in photographic processes which can correct one or more colors without affecting other colors.

An additional object of the present invention is to provide such a device which will be compact in size, easy to operate, and will produce photographic reproductions having full color saturation.

A further object of the present invention is to provide dichroic filter color balance systems which are readily and economically manufactured.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention, reference should be had to the following detailed description taken in connection with the accompanying drawings, in which.

Figure 5:
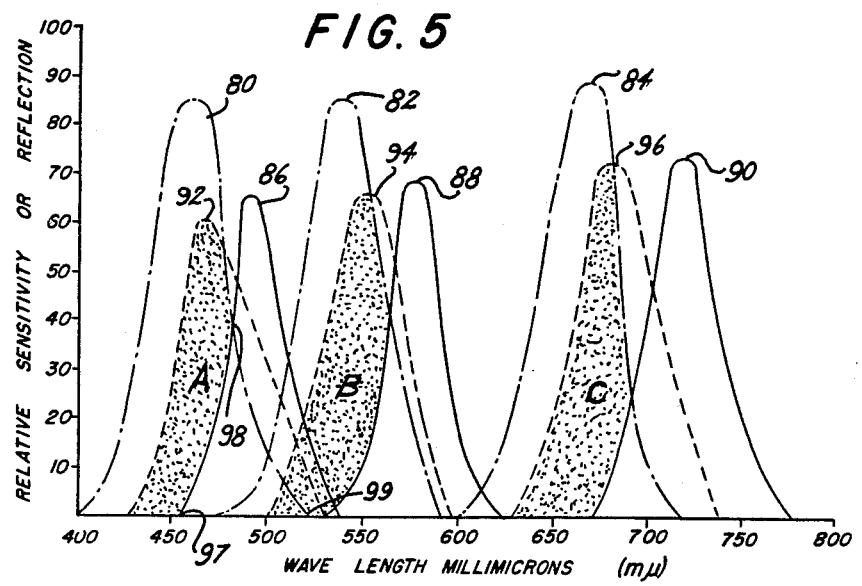
Figure 6:
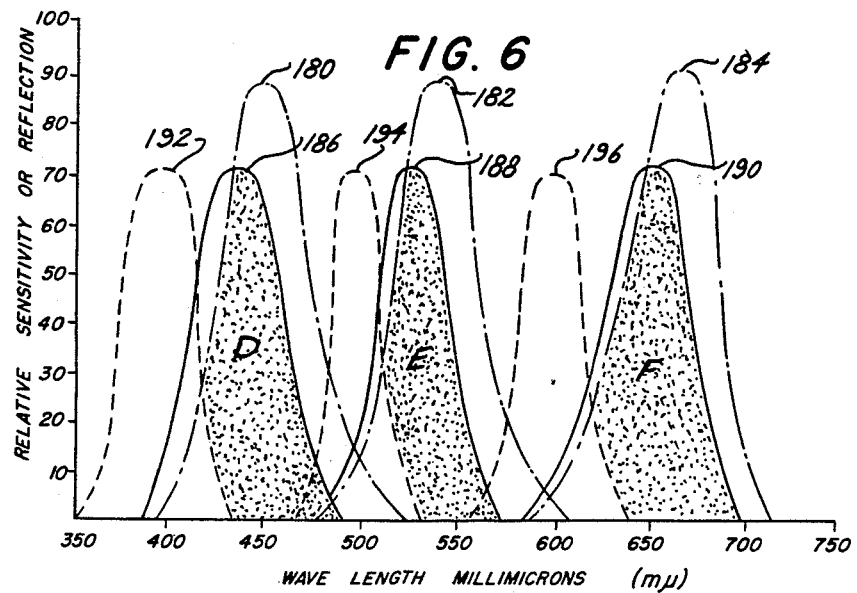

FIG. 5 is a graph illustrating the sensitivity of a color emulsion plotted against wave lengths of light in millimicrons; and the percent of reflection of three dichroic filters, in a position normal to the incidence of light and at an angular incidence to light, both plotted against wave lengths of light in millimicrons; and FIG. 6 is a graph, similar to the graph in FIG. 5, illustrating color sensitive material and the reflection of three different dichroic filters both in a normal position and in a tilted position.

Figure 1:
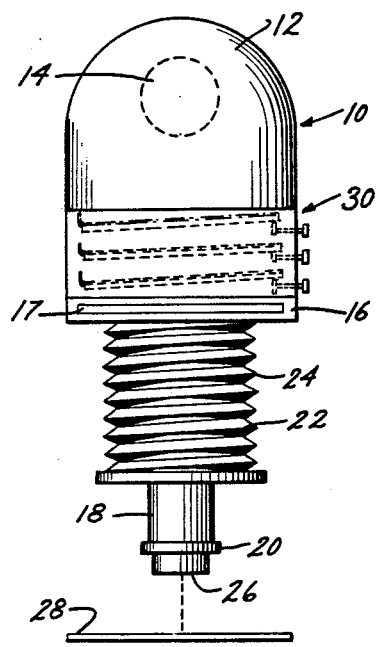
FIG. 1 is a lateral view of a photographic enlarger illustrating an embodiment of a dichroic filter color balance system of the present invention located above the film to be enlarged.

Referring to the drawings in which like numerals identify similar parts throughout, it will be seen that, as illustrated in FIG. 1, one embodiment of the present invention can include a photographic enlarger 10, similar to those presently on the market, having a light housing 12, a light scource 14, a film carrier 16, containing a film 17, a lens housing 18, a lens diaphragm adjuster 20, and a focusing arrangement 22 which if desired can be of the bellows type 24. Within the lens housing 18 is a lens diaphragm opening 26 through which projected light passes to printing material 28 which is located below the lens.

Located between the light source 14 and the negative film housing 16 is a dichroic filter system 30, the subject of the present invention. As shown in detail in FIG. 3, the dichroic filter system can include a housing 32 having side walls 34—34, a rear wall 36 and a front wall (not shown). Located within the dichroic filter housing 32 are dichroic filters 40, 40 comprising sheets of glass 42, 42 having at least one surface covered with a dichroic 44, 44. One end 46, 46 of each of the dichroic filters 40, 40 is attached to one end wall 34 of the dichroic filter housing 32 by means of a pivot or hinge 48, 48. The opposite end 50, 50 of each dichroic filter 40, 40 is free to travel on means 60, 60 for changing the angularity of the dichroic filters which means can be of any desired form.

Figure 4:
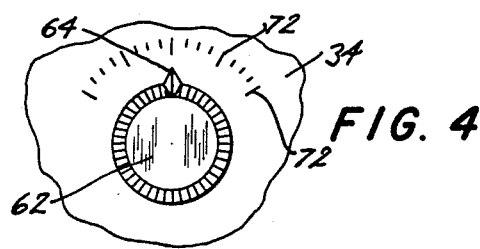
FIG. 4 is a detailed side view of one of the dichroic filter adjusting knobs shown in FIG. 3 and a filter positioning indicator dial.

A preferred embodiment of the means 60, 60 for changing the angularity of the dichroic filters 40, 40 can include a knob 62, 62 having a pointer 64, 64. Knob 62, 62 is on a shaft 66, 66 which passes through through bushings 68, 68 in end wall 34 of dichroic filter housing 32. Inside the dichroic filter housing 32 and attached to each shaft 66, 66 is a cam 70, 70 which varies the angle α of the dichroic filters 40—40. As shown in detail in FIG. 4, indicator lines 72, 72 can be placed on the side wall 34 of the housing 32. The indicator lines 72—72 can be graduated to show the angle α of a dichroic filter 40 means of pointer 64 of knob 62.

If desired, light baffles 74, 74 can be located within dichroic filter housing 32.

Figure 2:
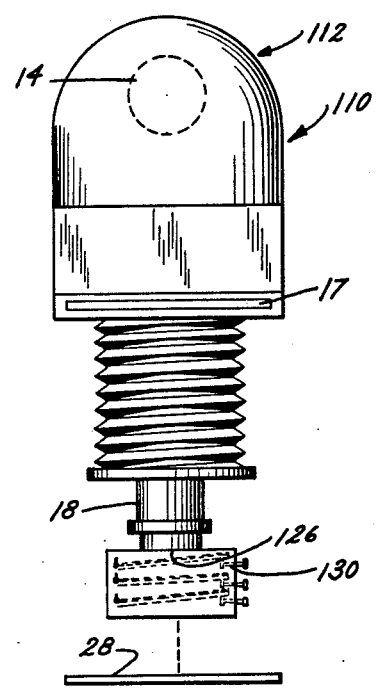
FIG. 2 is a lateral view of a photographic enlarger of the FIG. 1 embodiment, illustrating another embodiment and another positioning of the dichroic filter color balance system proposed in FIG. 1.

In FIG. 2, a photographic enlarger 110, similar to the photographic enlarger 10 of the FIG. 1 embodiment, is shown, but in FIG. 2 the dichroic filter system 130 is smaller in size and is attached to and located below the lens opening 126 rather than located in light housing 112.

The photographic enlargers 10 and 110 of the FIGS. 1 and 2 embodiments operate in the usual manner. In the FIG. 1 embodiment light from light source 14 is projected to the dichroic filter system 30 through which most light is transmitted but where some light of determined undesired wave lengths is reflected. The desired light is then projected through film 17, through lens housing 18 and out lens opening 26 to the material of be printed 28.

In the FIG. 2 embodiment the dichroic filter system 130 is located below the lens opening 126. The light from light source 14 of the FIG. 2 embodiment therefore passes through film 17 and lens housing 18 before it passes through the dichroic filter system 130.

If desired, the dichroic filter system could also be located between film 17 and lens housing 18, or incorporated in the lens system.

The graph in FIG. 5 illustrates the sensitivity of color printing material and the reflection of dichroic filters at both normal and angular incidence of light. Curves 80, 82 and 84, shown in dots and dashes, illustrate the sensitivity of color printing material 28. Curves 80, 82 and 84 are in the blue, green and red color ranges, respectively.

The curves 80, 82 and 84 are plotted to show the sensitivity of color printing material to various wave lengths of visible light.

Curves 86, 88 and 90 in FIG. 5, shown in solid lines, illustrate the reflection of light from the dichroic filters 40, 40 of the present invention when the dichroic filters are in a position normal to the projected light.

One filter 40 reflects light having wave lengths in the range of blue color, as shown by curve 86. Another filter 40 reflects light having wave lengths in the range of green color, as shown by curve 88, and the third filter 40 reflects light having wave lengths in the range of red color, as shown by curve 90.

Figure 3:
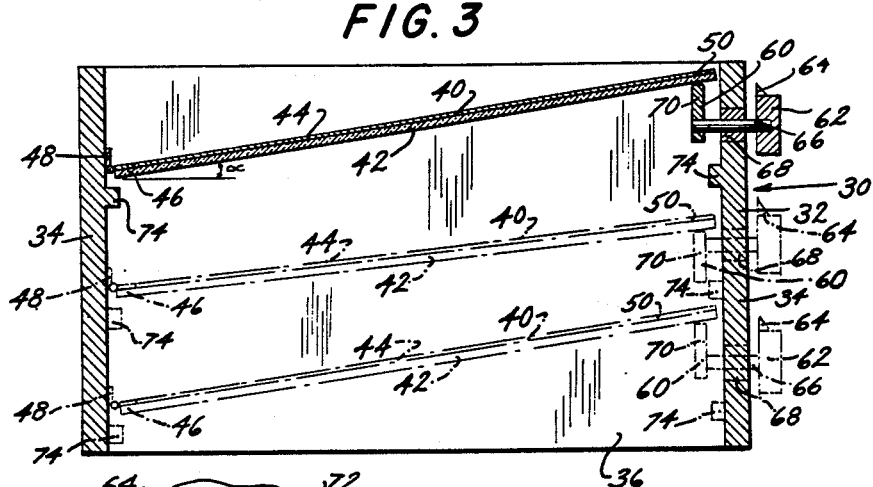
FIG. 3 is a transverse section to an enlarged scale of the dichroic filter balance system of the present invention.

When dichroic filters 40, 40 are tilted, light of shorter wave lengths is reflected, as shown by curves 92, 94 and 96 in dashed lines in FIG. 5. Curve 92 corresponds to curve 86 and shows the wave lengths of blue light which is reflected by a dichroic filter 40 in the tilted position while curve 86 shows the same filter in position normal to the projected light. The positioning of curve 92 is directly related to the angle α of the filter 40, as shown in FIG. 3. If angle α is decreased curve 92 would move closer to curve 86.

The area which falls under both curves 80 and 86 in FIG. 5 shows the amount of blue light which is reflected by a dichroic filter 40 in a position of normal incidence to the projected light and which would otherwise affect the printing material 28. This area is shown by numerals 97, 98 and 99. By tilting the dichroic filter 40 to an angle α the amount of light which is reflected by the filter and which would otherwise affect the printing material 28 is increased by an amount shown by the area A in dots under both curves 80 and 92.

Thus, by adjusting the angle of incidence for each of the three filters, complete control of the color balance of the photographic process can be achieved.

Similarly curves 94 correspond to curve 88 and show a dichroic filter 40 for green light in a tilted position. Area B shown in dots shows the increase in green light which is reflected by tilting a dichroic filter 40 which green light would otherwise affect printing material 28.

Curve 96 corresponds to curve 90 and shows a dichroic filter 40 for red light in a tilted position. Area C shown in dots shows the increase in red light which is reflected by tilting a dichroic filter 40 which red light would otherwise affect printing material 28.

Printing material 28 might have a sensitivity with peak wave lengths slightly greater than the peak reflection wave lengths of the dichroic filters 40,40, as shown in FIG. 6. In FIG. 6 curves 180, 182, 184, 186, 188, 190, 192, 194 and 196 correspond to curves 80, 82, 84, 86, 88, 90, 92, 94 and 96, respectively, in FIG. 5. Curves 180, 182 and 184 in FIG. 6, shown in dotted and dashed lines illustrate the sensitivity of color printing material.

Curves 186, 188 and 190 in FIG. 6, shown in solid lines, illustrate the reflection of light from the dichroic filters in a position normal to the projected light.

Curves 192, 194 and 196, in dashed lines in FIG. 6, each shows the wave lengths of light which are reflected by dichroic filters when tilted and correspond to curves 186, 188 and 190, respectively.

FIG. 6 is similar to FIG. 5, however, in FIG. 6 when the dichroic filters are tilted the amount of light, which is reflected by the filters and which if permitted to pass through the filters would affect the printing material, is reduced. This reduction is shown by dotted areas D, E and F.

One or more dichroic filters 40 can be used in the present invention. It is possible to achieve complete red, green and blue color balance control by the use of only two dichroic filters. In this case one color remains unchanged and the other two are varied to obtain the desired color balance.

Dichroic filters of the present invention can also be used by photographers when taking pictures. The dichroic filters are placed in front of the camera and adjusted to produce the desired color balance.

The present systems of dichroic color control also have application in printing on black and white variable contrast paper. In the case of black and white paper the contrast is controlled by the use of yellow and blue filters. The contrast of the papers and the finished print depend upon the color of the filter combinations placed in the path of the light. One or possibly two dichroic filters could be used to control the amount of blue light transmitted.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A variable hue, substantially constant color saturation, dichroic filter color balance system for photographic reproduction comprising, in combination; a light source; a supporting frame; a plurality of dichroic interference filters in series, each having the property of shifting its spectral reflection and spectral transmission with a change in the angularity of the incidence of light from said light source; pivotal means connecting each of said dichroic interference filters with said supporting frame; means for rotating each of said dichroic interference filters about said pivotal means to thereby change the frequency of the waves of light which are transmitted through said filters; and a portion of the light from said source passing through said dichroic interference filters and through film to a light sensitive surface.

2. The dichroic filter color balance system of claim 1 in which the dichroic interference filters comprise a blue reflecting dichroic filter, a red reflecting dichroic filter and a green reflecting dichroic filter, in series, each having the property of shifting its spectral reflection and spectral transmission with a change in the angularity of the incidence of light from the light source.

3. The dichroic filter color balance system of claim 1 in which the dichroic interference filters comprise a blue reflecting dichroic filter, and a yellow reflecting dichroic filter in series, each having the property of shifting its spectral reflection and spectral transmission with a change in the angularity of the incidence of light from the light source.

4. A variable hue, substantially constant color saturation, dichroic filter color balance system for photographic reproduction comprising, in combination; a light source; a supporting frame; a plurality of dichroic interference filters in series, each having the property of shifting its spectral reflection and spectral transmission with a change in the angularity of the incidence of light from said light source; hinge means connecting each of said dichroic interference filters with said supporting frame; rotatable cam means for turning each of said dichroic interference filters about said hinge means to thereby change the optical path of the light transmitted therethrough; and a portion of the light from said source passing through said dichroic interference filters and through film to a light sensitive surface.

References Cited in the file of this patent

UNITED STATES PATENTS

| | | |
|---|---|---|
| 2,218,253 | Weaver | Oct. 15, 1940 |
| 2,256,385 | Evans et al. | Sept. 16, 1941 |
| 2,369,457 | Hanson et al. | Feb. 13, 1945 |
| 2,687,670 | Locquin | Aug. 31, 1954 |
| 2,742,837 | Streiffert | Apr. 24, 1956 |
| 2,834,246 | Foskett et al. | May 13, 1958 |

FOREIGN PATENTS

| | | |
|---|---|---|
| 727,410 | Great Britain | Mar. 30, 1955 |